United States Patent
Rath et al.

(10) Patent No.: US 9,724,645 B2
(45) Date of Patent: Aug. 8, 2017

(54) ELECTROCHEMICALLY REGENERATED WATER DEIONIZATION

(75) Inventors: David Francis Rath, Dundas (CA); Kevin James Ryan Elliott, Burlington (CA); Lyle E. Kirman, Cleveland Heights, OH (US)

(73) Assignee: TANGENT COMPANY LLC, Chagrin Falls, OH (US)

( * ) Notice: Subject to any disclaimer, the term of this patent is extended or adjusted under 35 U.S.C. 154(b) by 1008 days.

(21) Appl. No.: 13/364,540

(22) Filed: Feb. 2, 2012

(65) Prior Publication Data
US 2013/0199931 A1    Aug. 8, 2013

(51) Int. Cl.
| | |
|---|---|
| *C02F 1/469* | (2006.01) |
| *B01D 61/48* | (2006.01) |
| *B01D 61/46* | (2006.01) |
| *B01D 61/44* | (2006.01) |
| *B01D 61/54* | (2006.01) |
| *B01D 61/52* | (2006.01) |
| *B01D 65/08* | (2006.01) |
| *C02F 1/46* | (2006.01) |

(52) U.S. Cl.
CPC ........... *B01D 61/54* (2013.01); *B01D 61/445* (2013.01); *B01D 61/48* (2013.01); *B01D 61/52* (2013.01); *B01D 65/08* (2013.01); *C02F 1/4602* (2013.01); *C02F 1/4695* (2013.01); *B01D 2313/32* (2013.01); *B01D 2321/22* (2013.01); *C02F 2209/055* (2013.01); *C02F 2209/06* (2013.01); *C02F 2303/22* (2013.01)

(58) Field of Classification Search
CPC .... B01D 65/08; B01D 61/52; B01D 2311/08; C02F 2303/22; C02F 5/02; C02F 1/4602
USPC .......................................................... 204/525
See application file for complete search history.

(56) References Cited

U.S. PATENT DOCUMENTS

| | | | |
|---|---|---|---|
| 2,980,598 | A | 4/1961 | Stoddard |
| 3,149,061 | A | 9/1964 | Parsi |
| 3,562,433 | A | 2/1971 | Ambrosio |

(Continued)

FOREIGN PATENT DOCUMENTS

| | | |
|---|---|---|
| DE | 3338194 | 5/1985 |
| EP | 0839762 | 5/1998 |

(Continued)

OTHER PUBLICATIONS

Written Opinion and International Search report issued in International Application No. PCT/US2012/069474, dated Mar. 31, 2013.

(Continued)

*Primary Examiner* — Keith Hendricks
*Assistant Examiner* — Salil Jain
(74) *Attorney, Agent, or Firm* — Pearne & Gordon LLP

(57) ABSTRACT

An apparatus and method for abating scale formation during the purification and demineralization of water in an electrochemical deionization apparatus. In the apparatus and method, scale forming ions in a raw water feed are precipitated at a controlled location remote from the deionization chambers of the deionization apparatus. Concentrate water produced during the deionization process to produce demineralized product water is acidified and circulated through the deionization apparatus to prevent scale formation and buildup in the deionization apparatus.

6 Claims, 7 Drawing Sheets

(56) References Cited

U.S. PATENT DOCUMENTS

| | | | |
|---|---|---|---|
| 3,844,927 A * | 10/1974 | Smith | 204/630 |
| 4,032,452 A | 6/1977 | Davis | |
| 4,062,756 A | 12/1977 | Jha et al. | |
| 4,067,794 A | 1/1978 | Ganzi et al. | |
| D248,157 S | 6/1978 | Ganzi et al. | |
| 4,465,573 A | 8/1984 | O'Hare | |
| 4,632,745 A | 12/1986 | Giuffrida et al. | |
| 4,687,561 A | 8/1987 | Kunz | |
| 4,747,929 A | 5/1988 | Siu et al. | |
| 4,871,431 A | 10/1989 | Parsi | |
| 4,925,541 A | 5/1990 | Giuffrida et al. | |
| 4,964,970 A | 10/1990 | O'Hare | |
| 4,969,983 A | 11/1990 | Parsi | |
| 5,032,265 A | 7/1991 | Jha et al. | |
| 5,154,809 A | 10/1992 | Oren et al. | |
| 5,211,823 A | 5/1993 | Giuffrida et al. | |
| 5,240,579 A | 8/1993 | Kedem | |
| 5,259,936 A | 11/1993 | Ganzi | |
| 5,316,637 A | 5/1994 | Ganzi et al. | |
| 5,368,702 A * | 11/1994 | de Nora | 205/373 |
| 5,423,965 A | 6/1995 | Kunz | |
| 5,427,667 A | 6/1995 | Bakhir et al. | |
| 5,540,819 A | 7/1996 | Bakhir et al. | |
| 5,736,023 A | 4/1998 | Gallagher et al. | |
| 5,788,826 A | 8/1998 | Nyberg | |
| 5,837,124 A * | 11/1998 | Su et al. | 205/746 |
| 5,858,191 A | 1/1999 | DiMascio et al. | |
| 5,954,935 A | 9/1999 | Neumeister et al. | |
| 6,056,878 A | 5/2000 | Tessier et al. | |
| 6,149,788 A | 11/2000 | Tessier et al. | |
| 6,248,226 B1 | 6/2001 | Shinmei | |
| 6,274,018 B1 | 8/2001 | Hidaka | |
| 6,274,019 B1 * | 8/2001 | Kuwata | 204/632 |
| 6,280,599 B1 | 8/2001 | Osvath et al. | |
| 6,284,124 B1 | 9/2001 | DiMascio et al. | |
| 6,296,751 B1 | 10/2001 | Mir | |
| 6,416,645 B1 | 7/2002 | Sampson et al. | |
| 6,471,867 B2 | 10/2002 | Sugaya et al. | |
| 6,514,398 B2 | 2/2003 | DiMascio et al. | |
| 6,596,145 B2 | 7/2003 | Moulin et al. | |
| 6,607,647 B2 | 8/2003 | Wilkins et al. | |
| 6,649,037 B2 | 11/2003 | Arba et al. | |
| 6,726,822 B2 | 4/2004 | Garcia et al. | |
| 6,733,646 B2 | 5/2004 | Sato et al. | |
| 6,808,608 B2 | 10/2004 | Srinivasan | |
| 6,824,662 B2 | 11/2004 | Liang et al. | |
| 6,843,895 B2 | 1/2005 | Bakir et al. | |
| 7,033,472 B2 | 4/2006 | Yamanaka et al. | |
| 7,083,733 B2 | 8/2006 | Freydina et al. | |
| 7,247,225 B2 | 7/2007 | Miwa et al. | |
| 7,279,083 B2 | 10/2007 | Emery et al. | |
| 7,329,358 B2 | 2/2008 | Wilkins et al. | |
| 7,336,600 B2 | 2/2008 | Feng et al. | |
| 7,427,342 B2 | 9/2008 | Barber | |
| 7,459,088 B2 | 12/2008 | Davis | |
| 7,470,366 B2 | 12/2008 | Queen et al. | |
| 7,481,929 B2 | 1/2009 | Wilkins et al. | |
| 7,563,351 B2 | 7/2009 | Wilkins et al. | |
| 7,572,359 B2 | 8/2009 | Liang et al. | |
| 7,582,198 B2 | 9/2009 | Wilkins et al. | |
| 7,604,725 B2 | 10/2009 | Ganzi et al. | |
| 2002/0139676 A1 | 10/2002 | Moulin et al. | |
| 2003/0089609 A1 | 5/2003 | Liang et al. | |
| 2003/0089622 A1 * | 5/2003 | Henuset et al. | 205/703 |
| 2004/0206627 A1 | 10/2004 | Bejtlich, III et al. | |
| 2005/0098436 A1 | 5/2005 | Miwa et al. | |
| 2005/0103622 A1 | 5/2005 | Jha et al. | |
| 2005/0103630 A1 | 5/2005 | Ganzi et al. | |
| 2005/0103631 A1 | 5/2005 | Freydina et al. | |
| 2005/0103644 A1 | 5/2005 | Wilkins et al. | |
| 2005/0103717 A1 | 5/2005 | Jha et al. | |
| 2005/0103722 A1 | 5/2005 | Freydina et al. | |
| 2005/0103723 A1 | 5/2005 | Wilkins et al. | |
| 2005/0103724 A1 | 5/2005 | Wilkins et al. | |
| 2005/0173242 A1 * | 8/2005 | Elgressy | C02F 1/4602 204/229.4 |
| 2005/0263457 A1 | 12/2005 | Wilkins et al. | |
| 2006/0060532 A1 | 3/2006 | Davis | |
| 2006/0157422 A1 | 7/2006 | Freydina et al. | |
| 2006/0231403 A1 | 10/2006 | Riviello | |
| 2008/0067069 A1 | 3/2008 | Gifford et al. | |
| 2008/0115925 A1 * | 5/2008 | Tanaka et al. | 165/303 |
| 2011/0210069 A1 | 9/2011 | Xiong et al. | |
| 2013/0175221 A1 | 7/2013 | Kim et al. | |

FOREIGN PATENT DOCUMENTS

| | | |
|---|---|---|
| EP | 1661863 | 5/2006 |
| GB | 906440 A | 9/1962 |
| RU | 2305071 | 8/2007 |
| SU | 132132 | 1/1960 |
| UA | 925 | 12/1993 |
| WO | 2005042808 A1 | 5/2005 |
| WO | 2009051612 | 4/2009 |

OTHER PUBLICATIONS

PCT/US07/22204 International Search report, Published Apr. 24, 2008.

PCT/US08/005195 Written Opinion of the International Searching Authority and International Search Report.

Information Disclosure Statement (Filed on Jun. 20, 2006) in U.S. Appl. No. 11/105,135 entitled Regeneration of Adsorption Media Within Electrical Purification Apparatuses: Filed Apr. 13, 2055 (abandoned).

Supplementary European Search Report issued in corresponding European Patent Application No. EP12867200; Dated Sep. 15, 2015.

* cited by examiner

ELECTROCHEMICALLY REGENERATED WATER DEIONIZATION

FIELD OF THE INVENTION

The invention relates to the field of water purification and demineralization methods and apparatus.

BACKGROUND OF THE INVENTION

Most if not all electrodeionization (EDI) systems require extensive pre-treatment including softening and reverse osmosis (RO) to remove hardness and excessive dissolved solids. EDI system influent limits on hardness are typically from <0.5 mg/L to <2.0 mg/L as calcium carbonate in order to prevent scale formation in the concentrating chamber(s) and cathode chamber(s). EDI systems are also limited in terms of the maximum total dissolved solids (TDS) and dissolved carbon dioxide that can be present in the influent. If these influent limits are exceeded, the cell will be overloaded and fail to produce the product water quality that is expected. For example, the influent specifications for several commercial EDI systems are given in Table 1 (information from manufacturers' product brochures).

TABLE 1

| PRODUCT | MAXIMUM HARDNESS | FEED TEA* OR CONDUCTIVITY |
| --- | --- | --- |
| OMEXELL EDI 210 | <2 mg/L as CaCO3 | <25 TEA |
| OMEXELL EDI 210U | <0.5 mg/L | <8 TEA |
| E-CELL MK-3 | <1.0 mg/L | <25 TEA |
| IONPURE LX-X | <1.0 | <40 uS/cm |
| Snow Pure XL-R | <1.0 | <33 uS/cm |

*TEA = Total Exchangeable Anions as CaCO3. Dissolved carbon dioxide gas becomes bicarbonate, an exchangeable anion, in EDI systems.

All of these manufacturers also specify that the feed water must be RO permeate or equivalent. The reason why these commercial EDI systems have limited capacity for dissolved solids is because they are designed for continuous flow and they are removing the dissolved ions with electricity at the same rate that the dissolved ions enter the system. They have extremely limited capacity of regenerated resin and essentially no usable stored capacity. Because residential water usage patterns are intermittent, ranging from 0 gpm to over 6 gpm at peak flows, a purification device sized to purify peak flows instantaneously would be quite large and uneconomical.

A further drawback of conventional water softening using ion exchange resins is that the hardness in the water is replaced with sodium ions from an NaCl regenerant. NaCl regeneration produces brine waste consisting mainly of NaCl, $CaCl_2$, $MgCl_2$ and the like. Increasing environmental restrictions on discharge of brine wastes and salt-brine regenerated softeners makes removal of hardness from potable water without the use of NaCl and resulting brine waste desirable.

SUMMARY OF THE INVENTION

The method and apparatus of the invention are intended to purify water using electro-deionization (EDI) technology without the need for any pre-treatment other than filtration to remove suspended solids. This apparatus and method is designed to process water with a hardness concentration up to on the order of 340 mg/L without deleteriously forming scale in the EDI cell portion of the system. Instead, the scale is intentionally precipitated in a specialized cell designed for this purpose. Further, by circulating low pH concentrate through the concentrate and cathode chambers of the EDI unit, any scale that does form in them can be easily removed simply by turning off the DC current to the EDI unit and continuing to recirculate the low pH concentrate through these chambers. Furthermore, the low pH concentrate increases the solubility of scale minerals such as $CaCO_3$ and $MgCO_3$ etc., thereby reducing the scaling potential in these chambers.

In addition, the method and apparatus of this invention are based upon a relatively large stored capacity in regenerated ion exchange resins. This capacity is achieved by a relatively large volume of ion exchange resins that is efficiently regenerated at a slow rate and most of this regeneration occurs during periods of no product water flow. Due to these features, a much higher influent concentration of dissolved solids can be treated, provided that the total mass per day of dissolved solids in the feed does not exceed the capacity of the resins that are regenerated in a day. Typically, the method and apparatus described herein can process up to 1,135 liters per day of water with a TDS concentration of up to 400 mg/L of dissolved solids. Even higher daily loading of TDS or higher peak flow rates can also be accommodated simply by adding more deionization cells to the EDI portion of the system.

Pursuant to the foregoing, in one aspect of the invention there is provided a method of abating scale formation in an electrodeionization apparatus comprising at least one ion exchange chamber interposed between cathode and anode electrode chambers, said method comprising introducing ion containing feed water into said electrodeionization apparatus and removing ions from said water therein; forming a concentrate stream comprising ions removed from said feed water by said ion exchange chamber; treating at least a portion of said concentrate stream remotely of said ion exchange chamber and said cathode chamber to precipitate and remove scale forming ions from said concentrate stream; forming an acidified concentrate remotely of said ion exchange chamber and said cathode chamber; and, introducing at least a portion of said acidified concentrate to said electrodeionization apparatus and contacting it with scale prone surfaces therein.

In some embodiments, said method comprises introducing ion containing feed water into an electrodeionization apparatus comprising at least one deionization cell interposed between the cathode chamber and anode chamber and treating at least a portion of the concentrate stream remotely of said deionization cell and cathode chamber to precipitate and remove scale forming ions from said concentrate stream remotely of said cell and cathode chamber; and, forming an acidified concentrate remotely of said deionization cell and said cathode chamber.

One aspect the method comprises causing said ion containing feed water to pass through a cation exchange chamber of said deionization cell in a first direction of flow and removing ions from said water therein; and thereafter causing said feed water to pass through an anion exchange chamber of said deionization cell in a second direction of flow substantially opposite said first direction of flow, and removing ions from said water therein. In another aspect of the invention, the electrodeionization apparatus comprises a plurality of deionization cells and the method comprises causing said ion containing feed water to pass through a cation exchange chamber of each said deionization cell in a first direction of flow and removing ions from said water therein; and thereafter causing said feed water from said cation exchange chamber to pass through an anion exchange chamber of said deionization cell in a second direction of flow substantially opposite said first direction of flow, and removing ions from said water therein.

In one embodiment the step of treating said concentrate stream to precipitate and remove scale comprises introducing said concentrate stream into a scale precipitation chamber of a concentrate conditioning unit comprising: a scale precipitation chamber containing at least one electrode operative at least as a cathode; an acidification chamber separated from said scale precipitation chamber by a cation exchange membrane; and, an anode chamber containing at least one electrode operative at least as an anode disposed adjacent said acidification chamber opposite said cation exchange membrane; and, energizing said electrode in said scale precipitation chamber as a cathode to cause scale forming ions in said concentrate stream to precipitate thereon; and, at least periodically removing at least a portion of said precipitated scale from said scale precipitation chamber. In some embodiments, the step of treating said concentrate stream to precipitate and remove scale forming ions comprises adjusting the pH of said concentrate stream to a pH of greater than about 8.4. In other embodiments, the pH is adjusted to a pH greater than about 10.

In some aspects of the invention, the scale precipitation chamber includes one or more electrodes and the step of treating said concentrate stream to precipitate and remove scale comprises configuring said one or more electrodes such that when energized as cathodes, the current density at said one or more electrodes is at least about 90 mA/cm$^2$. In other embodiments, the electrodes are configured to provide a current density at the cathode or cathodes of at least about 120 mA/cm$^2$.

In further embodiments, the anode chamber of said concentrate conditioning unit is separated from said acidification chamber by an interface that prevents the passage of chloride ions into said anode chamber, and the anode chamber contains a material selected from a chloride ion free anolyte solution or a regenerated cation exchange resin and substantially chloride free water. In particular aspects, the chloride free anolyte solution is a sodium sulfate solution.

According to one aspect of the method of the invention, the step of forming said acidified concentrate comprises acidifying said concentrate stream in said acidification chamber. In one embodiment, the anode chamber is separated from said acidification chamber by a bipolar interface, and said step of acidifying said concentrate comprises energizing said electrodes to generate hydrogen ions in said acidification chamber at said bipolar interface. In another embodiment, the anode chamber is separated from said acidification chamber by a cation exchange membrane, and said step of acidifying said concentrate comprises energizing said electrodes to generate hydrogen ions at said anode that migrate across said cation exchange membrane into said acidification chamber. In some embodiments, the concentrate is acidified to have a pH of less than about 3.0 and in other embodiments less than 2.2. In some embodiments, the step of contacting scale prone surfaces is conducted at least partially in the absence of an electric current between said electrodes.

In another aspect of the method of the invention, the make-up of said acidified concentrate is controlled to have sufficient ionic strength to prevent unwanted water splitting at current densities of at least about 30 mA/cm$^2$.

As will be apparent from the foregoing, it is another aspect of the invention to provide a water treatment apparatus comprising an electrodeionization unit comprising: a cation exchange chamber containing a cation exchange media; an anion exchange chamber containing an anion exchange media; a bipolar interface separating said cation exchange chamber and said anion exchange chamber; a cathode chamber located on a side of said cation exchange chamber opposite said bipolar interface, and containing at least one electrode operative at least as a cathode; an anode chamber located on a side of said anion exchange chamber opposite said bipolar interface, and containing at least one electrode operative at least as an anode; a concentrate chamber interposed between said anode chamber and said anion exchange chamber; and, a concentrate stream flow path coupled to said cathode chamber and said concentrate chamber; and, in addition thereto, a concentrate conditioning unit coupled to said concentrate stream flow path for receiving a concentrate stream produced by said electrodeionization unit comprising; a scale precipitation chamber in fluid communication with at least a portion of said concentrate stream and containing at least one electrode operative at least as a cathode; an acidification chamber adjacent said scale precipitation chamber and separated therefrom by a cation exchange membrane, said acidification chamber having an inlet coupled to a concentrate stream source and an outlet coupled to an acidified concentrate stream flow path; and, an anode chamber adjacent said acidification chamber opposite said scale precipitation chamber and containing at least one electrode operative at least as an anode; whereby, upon activation of said electrodes, scale forming ions present in a concentrate stream passing through said scale precipitation chamber are precipitated therein.

In some embodiments, the electrodeionization unit comprises multiple deionization cells disposed between said cathode chamber and said anode chamber, said deionization cells comprising: a cation exchange chamber containing a cation exchange media; an anion exchange chamber containing an anion exchange media; a bipolar interface separating said cation exchange chamber and said anion exchange chamber; a cation exchange membrane bounding said cation exchange chamber on a side opposite said bipolar interface; and, an anion exchange membrane bounding said anion exchange chamber on a side opposite said bipolar interface, wherein said cation exchange chamber and said anion exchange chamber have inlets and outlets coupled and configured such that water will flow through said cation exchange chamber in a direction substantially opposite the flow of water through said anion exchange chamber.

In some embodiments, at least one said anode chamber of said electrodeionization unit and said anode chamber of said concentrate conditioning unit is bound on a side adjacent its respective concentrate chamber or acidification chamber, by an interface adapted to prevent transport of chlorine ions into said anode chamber, and wherein said anode chamber contains a material selected from a non-chloride ion containing anolyte solution or a regenerated cation exchange resin and substantially chloride free water. In other embodiments, both said anode chamber of said electrodeionization unit and said anode chamber of said concentrate conditioning unit are bound on a side adjacent their respective concentrate chamber and acidification chambers, by an interface adapted to prevent transport of chlorine ions into said anode chamber, and wherein said anode chamber contains a material selected from a non-chloride ion containing anolyte solution or a regenerated cation exchange resin and substantially chloride free water. In certain aspects of the invention the interface is selected from a bipolar membrane and a cation exchange membrane.

In further embodiments of the invention, the electrodeionization unit and said concentrate conditioning unit are configured such that said anode chamber of said electrodeionization unit and said anode chamber of said concentrate conditioning unit are the same chamber, said concentrate chamber of said electrodeionization unit being disposed on one side thereof and said acidification chamber of said concentrate conditioning unit being disposed on the opposite side thereof. In some aspects of these embodiments, the anode chamber is separated from said concentrate chamber and said acidification chamber by an interface adapted to prevent transport of chlorine ions into said anode chamber, and wherein said anode chamber contains a material selected from a non-chloride ion containing anolyte solution or a regenerated cation exchange resin and substantially chloride free water. In certain of these embodiments, the interface is a bipolar membrane or a cation exchange membrane.

In one aspect of the invention, the concentrate stream source is a reservoir coupled to at least one of an output stream of said scale precipitation chamber, a raw feed water source or said concentrate stream flow path, whereby the ionic strength of said concentrate stream can be adjusted to prevent unwanted water splitting.

In some embodiments of the apparatus of the invention, the surface area of said electrode(s) in said scale precipitation chamber is less than about 1/10 the surface area of said electrode(s) in said anode chamber. In other embodiments, the surface area of said electrode(s) in said scale precipitation chamber is less than about 1/3 the surface area of said electrode(s) in said anode chamber.

In one embodiment, the cation exchange chamber and said anion exchange chamber have inlets and outlets coupled and configured such that water will flow through said cation exchange chamber in a direction substantially opposite the flow of water through said anion exchange chamber.

In one aspect of the invention, the scale precipitation chamber comprises a pair of cylindrical electrodes operative at least as cathodes rotatably mounted axially parallel to one another within said chamber, said electrodes including cooperating gears and being operatively linked to a motor, such that upon actuation of said motor the surfaces of said electrodes rotate passed each other and cause scale precipitated thereon to fall off said electrodes.

A fuller understanding of these and other aspects of the invention will be had from the following description of the invention, detailed description of preferred embodiments and the appended drawings.

DESCRIPTION OF THE INVENTION

Figure 1:
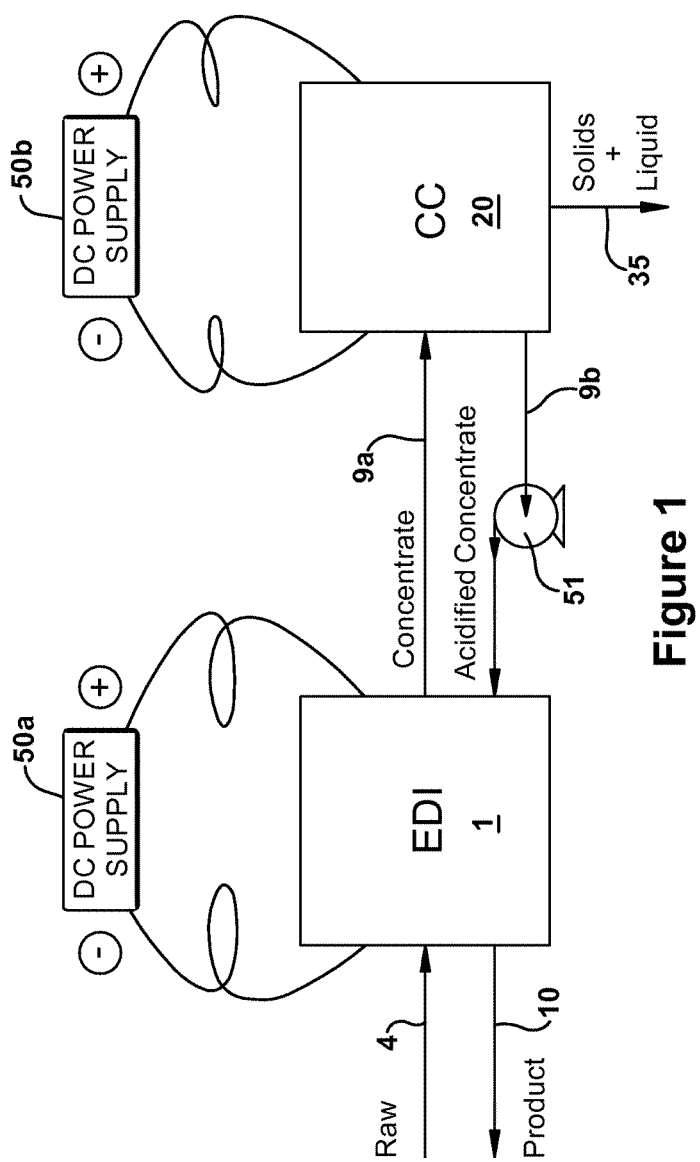
FIG. 1 is a schematic representation showing the principal components of an apparatus according to the invention.

The methods of and apparatus for removing ions from water according to the invention comprise the use of an electrodeionization (EDI) unit and a concentrate conditioning unit (CC). In the EDI unit, undesirable ions are removed from raw feed water to produce deionized product water. Except for weakly ionic species, the EDI unit removes substantially all dissolved ions, including heavy metals such as Pb, Zn, As and U, to less than 10 µS/cm. For reference, 10 µS conductivity corresponds to approximately 5 mg/L NaCl. Ions removed from the feed water are then concentrated into an aqueous waste or concentrate stream which is then treated in the CC unit to precipitate and remove scale forming ions from the concentrate stream. In addition, a concentrate stream is also acidified in the CC unit so that it can be recycled to the EDI unit in a condition that will work to inhibit scale formation and to clean the high pH surfaces therein where scale will tend to form, such as at the cathode and anion membrane surfaces of the EDI unit. Advantageously, the high ionic strength of this acidified concentrate stream also helps to increase the limiting current density (i.e., the point at which the water in the cell will to begin to dissociate), of the EDI unit. This advantageously allows the system to operate at higher current densities such that the unit does not need to be as large as would be required for cells incapable of running at such higher current densities.

In carrying out the methods of the invention, raw feed water is introduced into the EDI unit. The raw feed water is filtered to remove particulate material suspended in the feed. Suitable pre-filters for use in accordance with the apparatus of the invention are typically simple cartridge filter housings with a 1-5 micron cartridge and sized for peak flow rates on the order of 6 gpm. Advantageously, beyond the noted pre-filter to remove suspended solids, the raw feed water need not be pre-treated to remove ions prior to introduction into the EDI. As noted above, the method and apparatus described herein for residential applications can process up to 1,135 liters per day of water with a TDS concentration of up to 400 mg/L of dissolved solids in accord with most residential applications. Even higher daily loading of TDS can be accommodated for more robust applications simply by adding more deionization cells to the EDI unit of the system. One of ordinary skill in the art will be able to configure the apparatus to achieve sufficient stored ion removal capacity to meet any desired daily demands in view of the instant disclosure.

To that end, the EDI unit is comprised of one or more deionization cells. Each cell is comprised of a cation exchange chamber and an anion exchange chamber separated by a bipolar interface, and bounded on opposite sides of the bipolar interface by a cation exchange membrane and an anion exchange membrane, respectively. One or more of said deionization cells can be disposed between a pair of electrode chambers containing at least one electrode operative as a cathode on one side, and at least one electrode operative as an anode on the other side. Depending on the capacity needs of the device, the EDI unit can include any desired number of deionization cells. In operation, cation exchange media and anion exchange media in the ion exchange chambers are constantly being regenerated by hydrogen and hydroxyl ions, respectively, generated at the bipolar interface as a result of the DC current generated between the electrodes, including during periods of no or limited product water use. Because the ion exchange media is constantly regenerated, it has stored ion exchange capacity for periods of peak demand.

Suitable bipolar interfaces for use in accordance with the invention will be apparent to those of ordinary skill in the art in view of the instant disclosure. Bipolar membranes are preferred, and are commercially available from, for example, Astom Corporation of Japan under the tradename Neosepta, and from Fumatech Gmbh of Germany under the tradename Fumasep. Other methods for forming a bipolar interface include producing interfaces or surfaces where anion ion exchange resins are in contact with a cation exchange membrane, where cation exchange resins are in contact with an anion exchange membrane, or where anion resins touch cation resins as in EDI units with mixed bed resins.

As noted, the cation exchange chamber of the cell is bounded on a side opposite said bipolar interface by a cation exchange membrane and the anion exchange chamber of the cell is bounded on a side opposite said bipolar interface by an anion exchange membrane. Suitable ion exchange membranes may either be heterogeneous, where ground up ion exchange resins mixed with a polymeric binder and reinforcing fabric are made into sheets, or they may be homogeneous, where they are monomers or novolac resins that are already functionalized and cast into sheet form, either with or without a reinforcing fabric. Any ion exchange membrane with strong functionality and, if present, a reinforcing fabric that is compatible with the pH extremes it may see in service will work in this device. The preferred cation and anion exchange membranes for this device are heterogeneous membranes with very low water permeability, strong acid/base functionality and a reinforcing fabric such as those made by Mega Corporation in the Czech Republic or Membranes International in the United States, those made by Astom Corporation in Japan under the tradename Neosepta, and membranes made by Fumatech GmbH in Germany under the tradename Fumasep. Those of ordinary skill in the art will be able to select and implement suitable cation and anion exchange membranes for use in accordance with the invention in view of the instant disclosure.

The cation and anion exchange chambers of the electrodeionization cell contain cation and anion exchange media, respectively. Suitable cation exchange media according to the invention include any strong acid cation ion exchange media, particularly polymers of styrene and divinyl benzene that are functionalized with sulfonic acid groups. These include cation exchange resins such as C-100, C-150 and SST60 manufactured by the Purolite company and their corresponding resins made by the Dow Chemical Company, Lanxess and others that will be apparent to those skilled in the art in view of this disclosure. Other polymers may also be used if they are also functionalized with sulfonic acid groups. Suitable anion exchange media include any strong base anion exchange media, including both Type I and Type II strong base ion exchange resins. These resins are widely available as polymers of either styrene-divinyl benzene or acrylic polymers functionalized with amine groups, particularly type I or type II quaternary amine groups. Of these, the preferred resin is an acrylic polymer functionalized with type 1 quaternary amine groups such as A850, A860, and A870 manufactured by the Purolite Company, and analogous resins commercially available from Dow Chemical Company, Lanxess and other manufacturers known to those of ordinary skill in the art. Other anion exchangers with different structural backbones and functional groups will also work to some extent, however, the preferred resins have higher conductivities in the exhausted form which translates into lower voltage drops and more even current distribution during cell operation.

As indicated above, the advantages of the inventive method and apparatus derive, at least in part, from its reliance on stored ion exchange capacity produced by the low power, essentially continuous regeneration of the ion exchange media in the unit. To that end, the unit is configured to have a sufficient volume of ion exchange media to accommodate the ion exchange requirements at anticipated peak flows, and then to continuously regenerate that media, particularly during periods of nominal or no flow. In configuring such a system to have sufficient stored capacity for a particular application the following factors must be taken into account:

1. TDS concentration of the water to be treated as $CaCO_3$;
2. The maximum volume of water to be treated per day;
3. The maximum anticipated flow rate;
4. Operating capacity per liter of the ion exchange resins used in the system, which is substantially less than the total capacity, typically on the order of 70%;
5. An efficiency factor that is defined as the fraction of the DC current that regenerates exhausted ion exchange resin instead of just moving hydrogen and hydroxyl ions through the resin; and,
6. Percent recovery defined as a percentage of the feed water that becomes purified product water.

Items 1, 2 and 4 determine the minimum total volume of resin that the EDI portion of the system needs to contain, i.e., sufficient operating capacity when fully regenerated to purify all of the water used in a 24 hour period. Item 3 determines the cross-sectional area and depth of cation and anion exchange resin required in the EDI portion of the system to avoid excessive pressure drop. Typically, systems are designed to have a pressure drop of less than 10 psi at peak flow. Item 5 determines the amperage that must be applied to the EDI portion of the system, and item 6 defines the total volume of water that must be treated to result in the desired daily total volume. With these considerations, the capacity regenerated in a day can be tuned for the specific needs of the end user to optimize the power consumption versus the performance of the unit. This can be achieved using the following calculation:

$$Current = \frac{EFF \times \frac{AverageDailyVolume(L)}{\frac{1440\ min}{day} \times \frac{60\ sec}{min}} \times TDS\left(\frac{mg}{L} as\ CaCO3\right) \times \frac{\frac{2\ meq}{mmole}CaCO_3}{\frac{100\ mg}{mmole}CaCO_3} \times \frac{1\ eq}{1000\ meq} \times \frac{96485\ coulombs}{1\ eq\ e^-\ charge}}{\#\ Cell\ Pairs}$$

Notes: 1. Assuming all TDS can be considered as CaCO3
2. EFF=Faradaic Efficiency, which is the fraction of the DC current that is regenerating exhausted resin and not just moving H+ and OH– ions through the resin and into the concentrate chambers. Typically this is 40-50% in this device. Note: this differs from the overall energy efficiency of the device because it does not include the voltage.
3.1 coulomb=1 A/s
4.1 F=1 equivalent electric charge=96485 coulombs As noted above, the EDI unit according to the invention comprises one or more deionization cells as described above configured between electrode chambers. A first electrode chamber containing at least one electrode operative at least as a cathode is disposed adjacent, and preferably contiguous a cation exchange membrane of a cation exchange chamber of a deionization cell, and a second electrode chamber containing at least one electrode operative at least as an anode is disposed adjacent, though not necessarily contiguous, an anion exchange membrane of an anion exchange chamber of a deionization cell.

In the cathode chamber of the EDI unit, the at least one electrode operative as a cathode may be any material that is corrosion resistant to brine, and is not damaged by hydrogen gas evolution or an elevated pH environment. This includes various grades of stainless steel such as 316 and 317, Alloy 20, nickel and nickel alloys, as well as monel. In the anode chamber of the EDI unit, the at least one electrode operative as an anode may be any material that is dimensionally and chemically stable in the solutions to which it will be exposed. This includes platinum, and titanium coated with a catalytic coating of iridium oxide, ruthenium oxide, or mixed metal oxides. These and other materials suitable for use as electrodes in accordance with the invention will be apparent to those of ordinary skill in the art in view of the instant disclosure.

As described in more detail below, the cathode chamber is in fluid communication with a concentrate stream flow path, whereby cations entering the cathode chamber from an adjacent cation exchange chamber of the deionization cell can be transported out of the cathode chamber of the EDI unit for further treatment or conditioning in accordance with the invention, and whereby acidified or conditioned concentrate can, if desired, flow into the cathode chamber to assist in the cleaning and removal of scale from the high pH surfaces therein.

As also described in more detail below, the anode chamber in preferred configurations of the EDI unit according to the invention is separated from the flow path of the concentrate stream generated by the transport of anions from an adjacent anion exchange chamber of a deionization cell by an interface adapted to prevent transport of chloride ions into the anode chamber. A bipolar membrane has been found to work well for this purpose, though a cation exchange membrane also will prevent transport of the unwanted chloride ions into the anode chamber. In this configuration, a concentrate compartment in fluid communication with the concentrate stream flow path out of the EDI unit is disposed between the adjacent anion exchange chamber of the deionization cell and the anode chamber, whereby anions entering the concentrate compartment from an adjacent anion exchange chamber of the deionization cell can be transported out of the EDI unit for further treatment or conditioning in accordance with the invention, and whereby acidified or conditioned concentrate can flow into the concentrate compartment to assist in the cleaning and removal of scale from the high pH surface of the anion exchange membrane bounding the anion exchange chamber and concentrate compartment.

In the foregoing embodiment, the anode chamber is coupled to an anolyte source from which a non-chloride ion containing anolyte solution is circulated through the anode chamber. Suitable non-chloride ion containing anolyte solutions can comprise any solution that provides high conductivity and is not degraded by reactions at the anode surface, such as sodium sulfate, potassium sulfate, magnesium sulfate or acids such as methane sulfonic acid. A preferred anolyte solution comprises sodium sulfate. Because the bipolar membrane serves as an effective barrier to the transport of ions and, in particular, chloride ion from the adjacent concentrate compartment into the anode chamber, the electrode reaction at the anode consists almost exclusively of oxygen evolution, with concomitant stoichiometric production of hydrogen ions and, advantageously, does not involve significant evolution of chlorine. The absence of chlorine evolution avoids undesirable oxidation of unit components, and the evolution of oxygen at the anode contributes to maintaining a balanced production of hydrogen ions at the cation surface of the bipolar membrane and at the surface of the anode, respectively, and hydroxide ions at the anion surface of the bipolar membrane. This arrangement also allows the apparatus to employ a high chloride strength concentrate stream in the concentrate stream flow paths through the EDI unit, which advantageously increases the solubility of $CaCO_3$ and allows for low EDI cell voltage.

In some configurations of the foregoing embodiment, the anode chamber is coupled to an anolyte reservoir. In practice, the reservoir can be charged with a supply of anolyte that can be periodically replenished. Advantageously, the evolution of oxygen gas at the anode also provides a motive force to circulate the non-chloride ion containing anolyte through the anode chamber. In practice, a pump or other means to facilitate adequate circulation of the anolyte solution can be employed, as will be apparent to those of ordinary skill in the art in view of the instant disclosure. Similarly, in embodiments where the anode chambers of both the EDI unit and CC unit employ this non-chloride containing anolyte solution, the apparatus can be configured such that the respective anode chambers can share a common anolyte reservoir.

Alternatively, the anode chamber can be filled with regenerated cation exchange resin to provide conductivity, along with some chloride ion free water, such as product water from the EDI unit. To this end, an inlet to the anode chamber can be coupled through a suitable valve to the deionized product water flow path of the EDI. As discussed in more detail below, in this embodiment, the anode chamber of the EDI unit will preferably have an outlet coupled to an inlet to a similarly cation exchange resin filled anode chamber of the CC unit (described below) in order to flow said deionized product water through that chamber as well.

As seen in the drawings, in the methods and apparatus of the invention the aqueous concentrate stream of ions removed from the feed water in the EDI unit is treated in a concentrate conditioner (CC) unit to precipitate and remove scale forming ions from the concentrate stream at a controlled location and further to acidify the concentrate stream so that it can be recycled to the EDI unit and work to clean the surfaces of the EDI unit where scale will tend to form.

The CC unit of the invention comprises at least one scale precipitation chamber coupled to the concentrate stream from the EDI unit so as to receive at least a portion thereof for treatment, and an acidification chamber separated from said scale precipitation chamber by a cation exchange membrane. An anode chamber is disposed adjacent said acidification chamber opposite said scale precipitation chamber. In the preferred embodiments, the anode chamber of the CC is separated from the acidification chamber by an interface adapted to prevent the transport of chloride ions into the anode chamber in the same manner as the anode chamber of the EDI unit described above. In fact, in some embodiments, described in more detail below, the CC unit and the EDI unit can be configured to share the same anode and anode chamber, such that the CC unit can be conveniently integrated into a single appliance with the EDI unit.

The scale precipitation chamber includes at least one electrode disposed therein and operative at least as a cathode. The electrode material can be the same as described above for the cathode chamber of the EDI unit. The scale precipitation chamber has an inlet coupled to the concentrate stream of the EDI unit, and an outlet coupled to a concentrate reservoir. The scale precipitation chamber also includes a collection chamber configured to enable the capture and removal of scale that has been precipitated on, and subsequently removed from the cathode by operation of the unit. When the electrodes are energized, scale forming ions in the concentrate stream are precipitated on the cathode where, as a result of the electrodes being sized to produce a high current density at the cathode, the scale is blown off the cathode, where it can settle to the bottom of the precipitation chamber and into the collection chamber.

In operation, the pH of the concentrate flowing through the scale precipitation chamber is ideally adjusted to a pH of at least about 8.4, and more preferably at least about pH 10. This can be accomplished by adjusting the current between the electrodes in the CC unit and flow rate through the scale precipitation chamber. The former has the effect of introducing more hydroxyl ions into the concentration of protons and increasing pH, whereas the latter effectively dilutes the concentrate and decreases pH. The pH can be monitored by including pH meters at appropriate points in the concentrate flow path, all as will be apparent to those of ordinary skill in the art in view of the instant disclosure.

The collection chamber can consist of a reduced-velocity settling chamber, a backwashable particle filter, a disposable filter cartridge or a centrifuge. As seen in the drawings of the preferred embodiments, the reduced-velocity settling chamber can consist of a vessel with a conical bottom for collection and eventual flushing of scale particles through an automatic valve located at the bottom of the conical vessel. Because the diameter of the settling chamber is larger than the diameter of the scale precipitation chamber, the linear velocity of the particles contained in the concentrate entering the settling chamber is reduced and the particles can settle by gravity. In operation, the settling chamber is periodically purged of accumulated scale by a blow-down procedure, wherein a valve is operated to allow a series of small bursts, e.g., 80 to 100 ml, of concentrate to flow through the settling chamber and wash out settled scale therein. The high solids waste can be ported to a sanitary waste line or, alternatively, to a storage vessel for subsequent disposal off-site. If desired, the solids also can be separated from the concentrate by flushing the settling chamber into a hanging bag filter or the like.

The volume and frequency of the blow-down procedure will depend on the particular water source being treated. In some embodiments, the timing of the blow-down is coordinated with periodic adjustments of the composition (ionic strength) of the concentrate stream that are needed when the stream becomes too concentrated. Because a portion of the concentrate stream must be bleed off for this purpose anyway, it is advantageous to use that portion for the blow-down. The timing and volume to be purged can be determined by monitoring the conductivity of the concentrate cycling through the concentrate reservoir of the CC unit. By placing a conductivity probe in, for example, the flow path coupling the outlet of the concentrate reservoir and the inlet to the acidification chamber, one can monitor the conductivity of the concentrate stream. When the concentrate reaches, for example, 16,000 µS, then the blow-down valve can be actuated to produce a series of small 80-100 mL bursts every hour or more until the conductivity reaches the desired level, for example, 14,000 µS. The volume of concentrate purged during the blow-down procedure is then replaced with make-up water from, for example, the raw water feed and/or the product water flow path.

As noted, the acidification chamber of the CC unit is separated from the scale precipitation chamber by a cation exchange membrane. It includes an inlet coupled to a concentrate stream source, such as the concentrate reservoir shown in the drawings, and an outlet coupled to inlets in the concentrate compartments of the EDI unit via an acidified concentrate flow path into the EDI unit. The concentrate stream flowing through the acidification chamber is acidified therein by operation of the CC unit for subsequent use in cleaning the high pH and scale prone surfaces in the EDI unit.

In some embodiments the concentrate reservoir can be coupled to various sources of water capable of modifying the make-up of the concentrate stream cycling through the acidification chamber of the CC unit. In preferred embodiments it can be coupled via suitable valves and, if needed, pumps to one or more of the exit stream water from the scale precipitation chamber, raw feed water from the feed water flow path into the EDI unit, or water shunted from the concentrate stream flow path of the EDI unit. Each of these water sources can be used to adjust the chemistry of the concentrate in the concentrate reservoir and hence, the make-up of the concentrate stream throughout the system. In operation, the concentrate stream flowing through the acidification chamber of the CC unit is acidified by protons generated either at the anode, in embodiments where the anode chamber of the CC unit is separated from the acidification chamber by a cation exchange membrane, or at the surface of a bipolar interface in embodiments where the anode chamber is separated from the acidification chamber by, for example, a bipolar membrane.

As noted above and as shown in FIG. 4, rather than being configured as a stand alone unit separate from the EDI unit, in some embodiments the CC unit can be integrated into a single appliance with the EDI unit such that a single anode chamber containing one or more electrodes operative at least as anodes can serve as the anode(s) for both the EDI unit and the CC unit. In these embodiments, the anode chamber will be separated from both an adjacent concentrate compartment of the EDI unit on one side, and an adjacent acidification chamber of the CC unit on the opposite side, by interfaces adapted to prevent the passage of chlorine ions into the anode chamber. As noted above, a bipolar membrane is preferred for this purpose.

Although the inventive use of the CC unit according to the invention is shown and described herein as effective to address the problem of scaling on the high pH surfaces and membranes in an electrodeionization unit as described herein, it will be apparent to those of ordinary skill in the art from the instant disclosure that a CC unit will be useful to address the scaling problems of alternatively configured electrochemical cells having myriad configurations of the cathode and anode chambers, number and location of electrodes, electrode chambers and ion exchange chambers, flow paths through the ion exchange chambers and the like, such as those described in U.S. application Ser. No. 12/445,848 (Published International Application Serial No. PCT/US08/05195), incorporated herein by reference, or conventional electrodeionization cells employing mixed bed ion exchange resins without bipolar membranes. All such configurations that will benefit from the application of the inventive concept of remote scale precipitation are contemplated within the scope of the present invention.

These and other embodiments and a fuller understanding of the invention will be had from the following non-limiting detailed description of preferred embodiments.

DETAILED DESCRIPTION OF PREFERRED EMBODIMENTS

As shown in FIG. 1, a preferred embodiment for removing anions and cations in order to remove hardness and manage scale in accordance with the invention consists of two main electrochemical based components. The first component is an electrodeionization (EDI) unit 1 for removing ionic species from a raw feed water entering the EDI unit via flow path 4, which is then made available for use via product water flow path 10. The second component is a concentrate conditioner (CC) unit 20 to condition the concentrate stream pH and manage hardness scale. The electrodes in the EDI unit 1 and the CC unit 20 are operatively coupled to a D.C. power supply 50a, 50b, to energize the electrodes and carry out the desired electrochemical processes in the respective units.

Generally, the CC unit 20 is coupled to a concentrate stream of ions removed from the feed water stream 4 in the EDI unit 1 via concentrate stream flow path 9a. The concentrate steam from the EDI unit 1 is then treated in the CC unit 20 to remove scale, which is discharged from the system via waste conduit 35. A concentrate stream formed in the CC unit 20 is acidified in an acidification chamber therein (FIG. 2) to form an acidified concentrate stream that is coupled to the EDI unit 1 via acidified concentrate flow path 9b, where it can enter concentrate chambers therein and dissolve scale formed on the high pH surfaces in the EDI. Motive force for the acidified concentrate through flow path 9b can be provided, for example, by pump 51. To facilitate a further understanding of the invention, each of the EDI and CC units is described in more detail below.

EDI Unit

Figure 2:
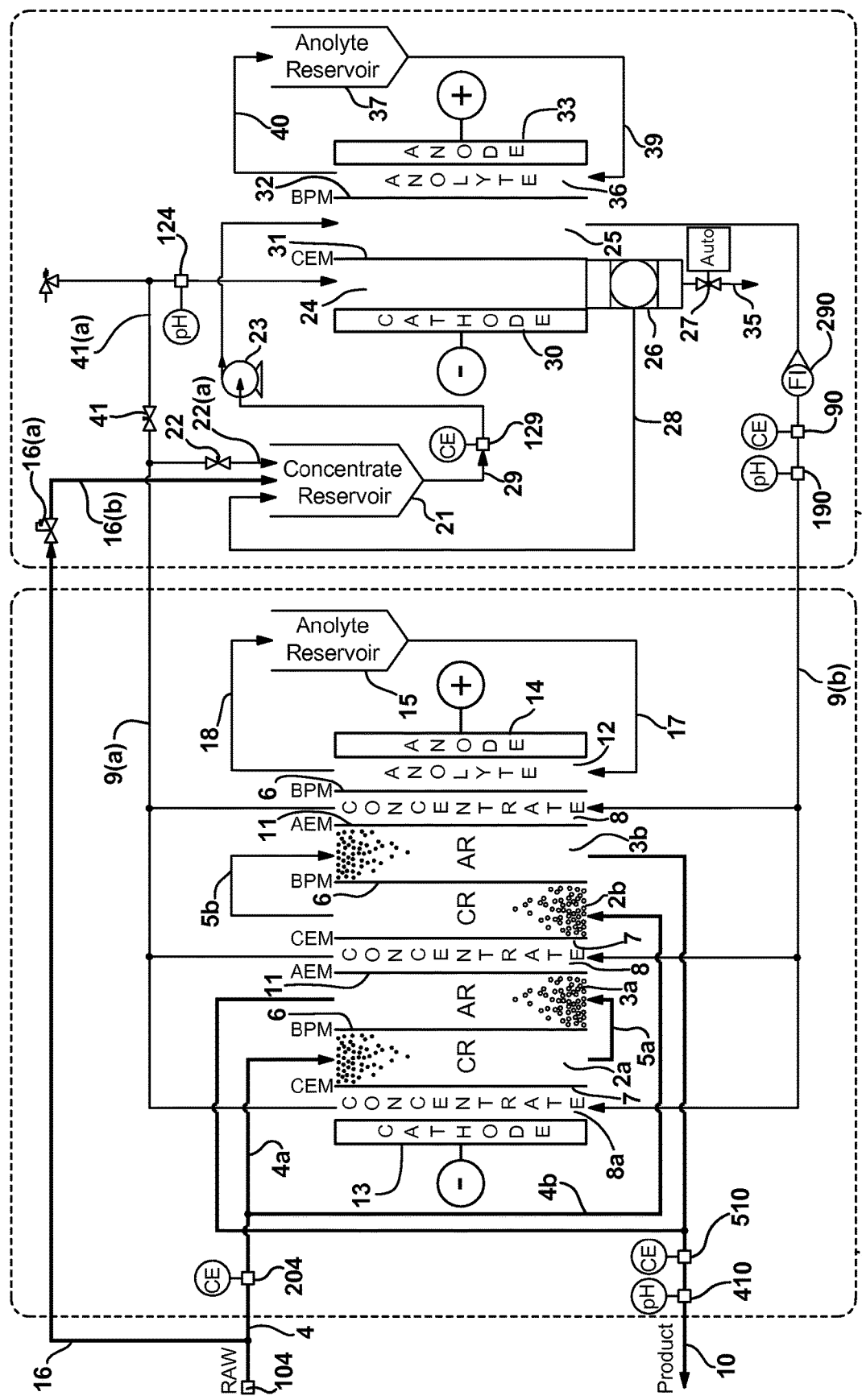
FIG. 2 is a schematic representation of the functional components of an apparatus according to the invention.

As shown in FIG. 2, after pretreatment by filter 104 to remove suspended solids, the water to be treated (or raw water) is conveyed to an EDI unit indicated by phantom line 1. As shown, the EDI unit 1 includes two deionization cells, respectively including cation exchange resin chambers 2a and 2b, and anion exchange resin chambers 3a, 3b, through which the raw water is passed. These cation exchange resin chambers and anion resin chambers are separated by bipolar membranes 6 and, respectively, contain cation and anion exchange media CR, AR, which operate to remove some or all of the cations and anions carried by the raw water to produce deionized product water.

The cation exchange chambers of each deionization cell are bounded on the side opposite said bipolar membranes 6 by cation exchange membranes 7, which: a) allow the passage of cations from the cation exchange resin into the adjacent concentrate compartment 8, 8a; b) prevent the migration of anions from the concentrate compartments 8, 8a into the cation exchange resin chambers 2a and 2b; and, c) prevent mixing, respectively, of water streams from compartments 2a and 2b, with water from the concentrate compartments 8, 8a. As shown in FIG. 2, the cathode chamber 8a is also a concentrate compartment which, like concentrate compartment(s) 8, is coupled to concentrate flow path 9a out of the EDI unit and acidified concentrate flow path 9b into the EDI unit. The net result is that cationic impurities taken up by the cation resin are moved through the cation exchange resin contained in the cation exchange chambers 2a, 2b, then through the cation exchange membranes 7, into the concentrate compartments 8, 8a, where they are transferred out of the EDI unit in concentrate stream flow path 9a.

Similarly, the anion exchange chambers 3a, 3b are bounded on the side opposite said bipolar membranes 6 by anion exchange membranes 11, which: a) allow the passage of anions from the anion exchange resin into the adjacent concentrate compartments 8; b) prevent the migration of cations from the concentrate compartments 8 into the anion exchange resin chambers 3a and 3b; and, c) prevent mixing, respectively, of water from compartments 3a and 3b, with water from concentrate compartments 8. The net result is that anionic impurities taken up by the anion resin are moved through the anion exchange resin, then through the anion exchange membranes 11, into the concentrate compartments 8, where they are transferred out of the EDI unit in concentrate stream flow path 9a.

Referring to FIG. 2, raw water from raw feed water flow path 4 is communicated to the inlets of the cation exchange resin chambers 2a and 2b via raw feed water flow paths 4a and 4b. If desired, raw water conduit 4 can include a conductivity sensor 204 in order for the system to get an initial read on the conductivity and, hence, concentration of electrolytes in the feed water. In order to balance the flow of current through the deionization cells, the raw feed water from raw feed water flow path 4 is divided into flow paths 4a and 4b which are respectively coupled to inlets located at opposite ends of cation exchange chambers 2a, 2b. In this way, raw feed water from flow path 4a will flow through cation exchange chamber 2a in a direction opposite that of raw feed water entering cation exchange chamber 2b via flow path 4b. The purpose of this flow pattern is to make the flow of electric current through the resin chambers and membranes more uniform, since there are significant difference in the conductivities of ion exchange resins in the regenerated and exhausted forms, the regenerated form being more conductive than the exhausted form for both cation and anion exchange resins. With the flow paths as described and as shown in FIG. 2, the electrical current distribution is more uniform at all levels of exhaustion or regeneration. To this end, raw feed water flow path 4 is divided into two streams, 4a, 4b, which are connected to opposing inlets of the respective cation exchange chambers of adjacent deionization cells.

As will be apparent, raw feed water flow path 4 can be divided and coupled to additional alternately opposing cation exchange chamber inlets of additional deionization cells to produce additional stored capacity to the EDI unit. Thus, although as shown the raw feed water is divided into two flow paths 4a, 4b in order that water will flow through adjacent cation (and anion) exchange resin chambers in opposite directions in order to balance the regions of relative resin exhaustion in adjacent cation (and anion) chambers, thereby balancing the flow of current therethrough, it will be apparent to those of ordinary skill in the art that flow path 4 can be divided into additional flow paths in order to facilitate counter-current flow through additional deionization cells.

Other methods of producing a more uniform current flow, such as baffle arrangements and the like as described in U.S. Ser. No. 12/445,848 (Published International Application Serial No. PCT/US08/05195) incorporated herein by reference, also can be employed in accordance with the present invention.

As the water flows through the cation exchange resin chambers 2a, 2b, cations carried by the water such as Ca++ and Mg++ contact the cation exchange resin and exchange into the resin with the concomitant net release of hydrogen ions (H+) into the water. This substantially decationized water flows from the cation exchange resin chambers 2a, 2b to the anion exchange resin chambers 3a and 3b via flow paths 5a and 5b, thereby providing counter-current flow through adjacent anion exchange chambers in a manner similar to the flow through adjacent cation exchange chambers. This will have the effect of again balancing regions of relative resin exhaustion across each deionization cell and hence, the current flow across the cells. As the decationized water flows through the anion exchange resin chambers, anions carried by the water such as bicarbonate and chloride contact the anion exchange resin and exchange into the resin with the concomitant release of hydroxide ions (OH−) into the water. The hydrogen ions and hydroxide ions released into the water, respectively, in the cation and anion exchange resin chambers, react substantially according to the neutralization reaction, H++OH−=H2O. The substantially deionized water, i.e. softened or product water, is conveyed from the last ion exchange chamber in the series through which it passes, anion exchange chambers 3a and 3b as shown, through product water flow path 10 where it can be distributed to, for example, a faucet for use or to a storage tank (not shown). In order to maintain desired qualities of the product water, product water flow path 10 can include various sensors, such as pH sensor 410 and conductivity sensor 510, to determine the pH and level of demineralization of the product water.

As a result of the cation exchange and anion exchange chambers of each deionization cell being separated by bipolar membranes 6, which upon the application of an external direct current from a power supply (FIG. 1) to the electrodes 13, 14, produce a steady flux of hydrogen ions and hydroxide ions, respectively, into the cation and anion exchange resins. These hydrogen and hydroxide ions, respectively, constitute the regenerant ions used in the ion exchange processes in the cation exchange chambers 2a and 2b, and the anion exchange chambers 3a and 3b.

In the embodiment shown in FIG. 2, the anode compartment 12 is separated from the adjacent concentrate compartment 8 by a bipolar membrane 6, and is supplied with a non-chloride ion containing anolyte solution from reservoir 15 via conduit 17 which solution is returned to reservoir 15 via conduit 18. In this embodiment, the preferred anolyte solution is comprised of sodium sulfate. The bipolar membrane 6 is an effective barrier to the transport of any ions, and chloride ion in particular, from the adjacent concentrate compartment 8 to the anode chamber 12. In certain embodiments, a cation exchange membrane can also be used. Since the recirculating anolyte solution contains substantially no chloride ion, the electrode reaction on anode 14 consists almost exclusively of oxygen evolution (with concomitant stoichiometric production of hydrogen ions), and, advantageously, does not involve significant evolution of chlorine. The absence of chlorine evolution avoids undesirable oxidation of stack components. The evolution of oxygen on anode 14 also provides a motive force to circulate the non-chloride anolyte solution from reservoir 15 through the anode chamber 12 and back to the reservoir. Alternatively, a pump (not shown) can be coupled to flow path 17 or 18 to drive this circulation loop. In an alternative preferred embodiment shown in FIG. 5, the anode compartment 12 is filled with cation exchange resin, and coupled to a source of chloride free product water via conduit 19 and valve 19a, as described in more detail below.

As seen in FIG. 2, the concentrate compartments 8, 8a also have inlets that are coupled to an acidified concentrate flow path 9b coming from the CC unit, whereby an acidified concentrate comprising a low-pH electrolyte solution concentrated in H+ and other ions removed from the raw water stream can be introduced into the concentrate compartments 8, 8a from the CC unit and suppress carbonate, hydroxide and oxide scale formation therein. In particular, the acidic pH increases the solubility of scale forming minerals and also suppresses water splitting on the cathode side of the cation exchange membranes 7 and on the anode side of the anion exchange membranes 11.

As a further step to avoid scaling, particularly in the cathode chamber 8a, the apparatus can be operated with intervals of low current flow or no current flow. During these intervals the acidified concentrate entering the concentrate compartments 8, 8a via acidified concentrate flow path 9b can re-dissolve any scale crystals or scale crystal nuclei that form in any of the concentrate compartments 8, including the cathode chamber 8a, and also in the membranes which form the boundaries of the concentrate compartments. For this step to be effective in a short time interval, the pH of the acidified concentrate conveyed to the concentrate chambers 8, 8a via flow path 9b should be maintained below a pH value of 3, and preferable below a pH value of 2.2. This can be readily accomplished by including various sensors, such as pH sensor 190 and conductivity sensor 90 in acidified concentrate stream flow path 9b, and associated circuitry. By monitoring the data from these sensors, flow and amperage can be adjusted to modify the make-up and pH of the concentrate stream if the pH exceeds the desired level.

Figure 3:
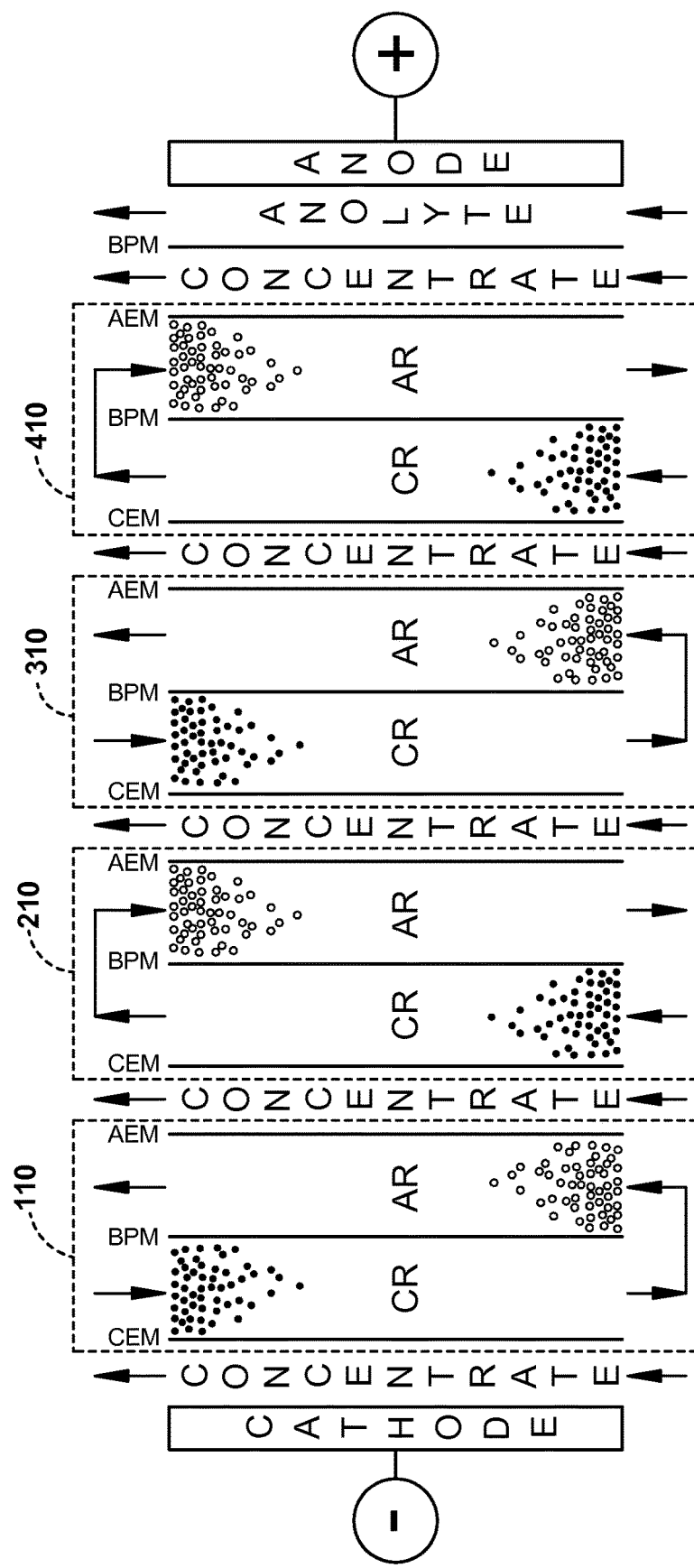
FIG. 3 is a schematic representation of the configuration of a plurality of deionization cells in accordance with one embodiment of the invention.

As noted above, the EDI unit according to the invention can be configured to include additional deionization cells in order to provide additional stored capacity. This is illustrated schematically in connection with FIG. 3. FIG. 3 illustrates an EDI configuration having a series of four deionization cells 110, 210, 310 and 410 shown in phantom line. As discussed above, the cells are configured between cathode and anode chambers such that the flow of feed water, as indicated by the arrows, is in opposite directions in adjacent cells 110-410. It will be within the skill in the art in view of the instant disclosure to configure the necessary raw water flow paths and the like to accommodate the embodiment illustrated in FIG. 3, as well as further embodiments incorporating yet additional deionization cells.

As will be apparent to those of ordinary skill in the art in view of the foregoing, the various chambers and membranes of the EDI unit can be configured in a stack and frame configuration or an annular configuration wherein the compartments are configured concentrically as is known in the art and as disclosed in, for example, U.S. Ser. No. 12/445,848 (Published International Application Serial No. PCT/US08/05195) incorporated herein by reference.

Concentrate Conditioning Unit (CC Unit)

In the CC unit of the present invention, indicated by phantom line 20 in FIG. 2, scale is intentionally precipitated at a controlled location where it can be removed from the system and disposed of. As indicated above, the EDI concentrate compartments 8, 8a of the EDI unit 1 are coupled to the CC unit 20 via concentrate flow path 9a. The CC unit includes a scale precipitation cell comprising a scale precipitation chamber 24 containing an electrode 30 operative at least as a cathode separated from a concentrate acidification compartment 25 by a cation exchange membrane 31, and an anode chamber 36 containing an electrode 33 operative at least as an anode disposed adjacent said concentrate acidification compartment 25 opposite said cation exchange membrane 31 and scale precipitation chamber 24.

The scale precipitation chamber 24 has an inlet coupled to concentrate stream flow path 9a via valve 41 and CC inlet flow path 41a, and an outlet coupled to a scale collection chamber 26. As shown, the scale collection chamber 26 comprises a reduced-velocity settling chamber having an outlet coupled, via an optional filter, to concentrate reservoir 21, via conduit 28, and an outlet coupled to waste conduit 35. As shown, waste conduit 35 includes an automatic valve 27 which can be actuated during a blow-down procedure to purge scale that has settled in the settling chamber 26 from the system.

The CC unit also includes an concentrate reservoir 21. An outlet from the concentrate reservoir 21 is coupled to an inlet in the concentrate acidification chamber 25, which in turn has an outlet coupled to inlets in concentrate compartments 8, 8a of the EDI unit via acidified concentrate flow path 9b. Motive force for concentrate from reservoir 21 to the inlet in concentrate acidification compartment 25 can be supplied by pump 23, for example. Water of varying compositions can be introduced into the concentrate reservoir 21 from multiple sources. As shown, reservoir 21 is coupled to an outlet in the scale collection chamber 26 via flow path 28, concentrate flow path 9a via valve 22 and concentrate inlet flow path 22a, and raw feed water from conduit 16 via valve 16a and raw water flow path 16b. By actuating valves 16a, 22 as desired, the composition of the concentrate in reservoir 21 can be adjusted. As noted above, the suitability of the concentrate stream make-up can be monitored with pH sensors and/or conductivity probes.

As shown in FIG. 2, conductivity sensor 129 is connected to conduit 29 leading from the concentrate reservoir 21 to the acidification chamber 25. Similarly, acidified concentrate flow path 9b includes conductivity sensor 90 and pH sensor 190. Data from these sensors can provide information as to both the acidity and the concentration of electrolytes in the concentrate stream. If the pH or conductivity of the concentrate stream ranges outside of system parameters, then automatic valve 27 can be actuated to commence a blow-down procedure that will both purge the system of solid scale waste and adjust the make-up of the concentrate stream. For example, using conductivity, if the system parameters require the concentrate stream to have a conductivity of approximately 14,000 µS, then when conductivity sensor 129 or 90 indicates that conductivity has risen to about 16,000 µS, automatic valve 27 can be actuated to initiate a series of short purges of on the order of 80 to 100 mL every hour or more until the system equalizes to produce the desired conductivity at sensors 129 and 90. The various sensors and valves that control the blow-down procedure and adjustment of the concentrate stream make-up can be coupled to a computer or other electronic control circuitry (not shown) to effectively monitor and control the operation of the apparatus. Those of ordinary skill in the art will be able to select and configure such circuitry in the implementation of the subject invention in view of the instant disclosure.

In order to effectively precipitate the hardness in scale precipitation chamber 24, the flow through conduit 41a and the current density are adjusted to maintain the pH in chamber 24 at a value greater than 8.4, and preferably at a pH value greater than 10.0. Under these conditions, scale will readily form on the cathode surface. As shown, the pH of the concentrate entering scale precipitation chamber 24 can be monitored by a pH sensor 124 on concentrate flow path 41a or a similar sensor in flow path 9a (not shown). When the pH falls out of the desired range, the flow rate of concentrate through precipitation chamber 24 and the current between electrodes 30 and 33 can be adjusted until the desired pH is established. Flow through the system can be monitored by, for example, flow meter 290.

In order to blow the scale off of the cathode so that it can fall by gravity into the scale collection chamber 26, the electrodes 30, 33 should be configured to produce a relatively high cathode current density, preferable a current density greater than 90 mA/cm$^2$, and preferably greater than 120 mA/cm$^2$. At this current density the hydrogen bubbles formed at the surface of cathode 30 continuously scrub the surface of the cathode to remove scale particles. To this end, the cathode or cathodes in the CC unit should have 5 to 10 times less surface area than that of the anode or anodes. While a variety of cathode materials may be used, a cathode surface of nickel 200 alloy has been found to be particularly suitable. Those skilled in the art will be able to size and configure the electrodes to produce desirably high current densities in excess of 90 mA/cm$^2$ in view of the instant disclosure.

When electrodes 30, 33, which are coupled to a D.C. power supply (FIG. 1) are energized, scale precipitates in chamber 24 primarily on the cathode 30 and, as a result of the high current density at the cathode in accordance with the preferred embodiment, is forced off the electrode by action of the hydrogen gas bubbles generated there. The liberated scale particles are sufficiently large and dense to permit them to fall into scale collection chamber 26, from which it can be extracted for periodic disposal by means of an automatic valve 27. The de-scaled concentrate exiting scale precipitation chamber 24 via conduit 28 is transferred to concentrate reservoir 21, optionally first passing through a filter (not shown) to remove any scale particles that do not settle out into the collection chamber 26.

In addition to this continuous high current density scrubbing of the cathode, the apparatus may be operated with intervals of low current flow or no current flow, during which intervals the acidified concentrate flowing into the concentrate chambers 8, 8a from acidified concentrate conduit 9b can re-dissolve any scale crystals or scale crystal nuclei that may build up in the scale precipitation chamber 24, such as on electrode 30 and also on the cation exchange membrane 31 that forms the boundary of the scale precipitation chamber. For this cleaning step to be effective in a short time interval, the pH of the concentrate conveyed to the scale precipitation chamber via flow path 41a should be maintained below a pH value of 3, and preferable below a pH value of 2.2. As noted, this can be accomplished with pH sensor 124 and associated control circuitry.

Figure 6:
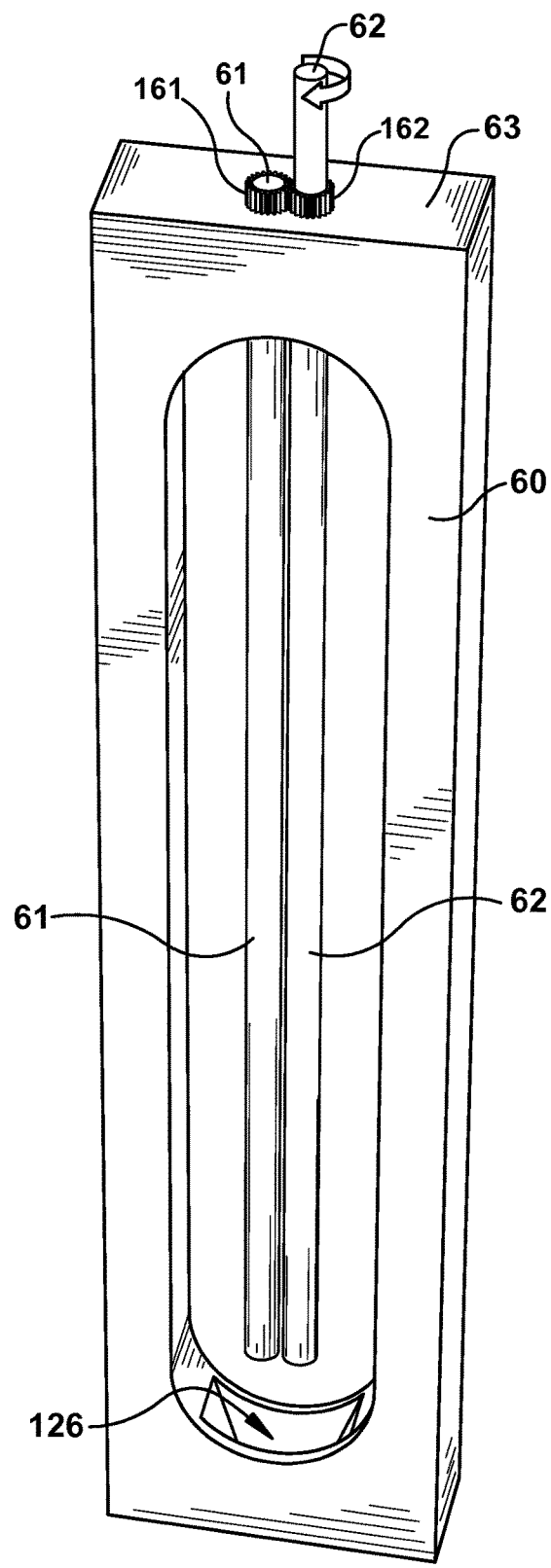
FIG. 6 is a schematic representation of a cathode configuration for a concentrate conditioning unit according to one embodiment of the invention.

In another embodiment shown in FIG. 6, the cathodes in the scale precipitation chamber 24 can be configured as a pair of rotating electrodes operable to dislodge scale precipitating thereon in the chamber. In this embodiment, the scale precipitation chamber includes a pair of closely spaced counter-rotating electrodes 61, 62 mounted on a frame 60 that is secured within scale precipitation chamber 24. The electrodes 61, 62 are coupled to a D.C. power supply (FIG. 1) and operative at least as cathodes. One electrode, as shown electrode 62, is coupled to a low rpm motor (not shown). The drive electrode 62 and secondary electrode 61 include complimentary gears 162, 161 that cooperate to rotate the electrodes upon actuation of the motor such that any scale precipitating thereon is effectively ground off the electrodes as their surfaces rotate passed one another. As in the embodiments described above, scale falling off of the electrodes can fall by gravity into settling chamber 26 via orifice 126 for subsequent removal.

As noted above, concentrate acidification chamber 25 is bounded on one side by cation exchange membrane 31, which forms a common boundary between it and scale precipitation chamber 24. As shown, acidification chamber 25 is bounded on the opposite side by bipolar membrane 32 although, as discussed above, other interfaces that will prevent the passage of chloride ions in particular into the anode chamber 36 can be used in some embodiments. The cation surface of bipolar membrane 32 faces cation exchange membrane 31 and the anion surface faces anode 33. Acidification chamber 25 receives concentrate from concentrate reservoir 21 via conduit 29, and is acidified by the flux of hydrogen ions from the bipolar membrane resulting from the passage of an external direct current between electrodes 30, 33. Alternatively, when a cation exchange membrane is used in place of bipolar membrane 32, protons generated at the anode cross the cation exchange membrane to acidify the concentrate in acidification chamber 25.

The acidified concentrate exits the acidification chamber 25 and is conveyed via acidified concentrate flow path conduit 9b to inlets in the concentrate chambers 8, 8a of the EDI unit. The low pH of this concentrate helps to dissolve scale that may form in these compartments and then carry it back to the CC unit for removal after it eventually passes through EDI concentrate compartments 8, 8a and back to concentrate flow path 9a.

In alternative embodiments, concentrate chamber 8(a) of the EDI unit 1 and acidification chamber 25 of the CC unit 20 can be coupled as an independent loop. In these embodiments, an outlet from the acidification chamber 25 is coupled to an inlet in the cathode/concentrate chamber 8a, and an outlet from chamber 8a is coupled to an inlet let in the concentrate reservoir 21. An outlet from the concentrate reservoir 21 is then coupled to inlets in concentrate chambers 8. In this way, acidified concentrate from the acidification chamber of the CC unit is fed directly to the cathode chamber of the EDI unit to perform its cleaning function therein. The remaining concentrate chambers 8 are cleaned by concentrate cycling from the concentrate reservoir.

Similar to a preferred anode chamber 12 of the EDI unit according to the invention, the anode chamber 36 of the CC unit is supplied with a non-chloride ion containing anolyte solution from reservoir 37 via conduit 39 which solution is returned to reservoir 37 via conduit 40. Since the recirculating anolyte solution contains substantially no chloride ion, the electrode reaction on anode 33 consists almost exclusively of oxygen evolution (with concomitant stoichiometric production of hydrogen ions) and, advantageously, does not involve significant evolution of chlorine. The absence of chlorine evolution avoids undesirable oxidation of stack components. The evolution of oxygen on anode 33 contributes to maintaining a balanced production of hydrogen ions, hydroxide ions and hydrogen ions, respectively, at the cation and anion surfaces of bipolar membrane 32, and at the surface of anode 33. The evolution of oxygen gas at the anode also provides the motive force to circulate the anolyte from reservoir 37 to the electrode chamber 36 and back to the reservoir. Alternatively, a pump (not shown) can be used to drive this circulation loop.

In operation, automatic valve 27, which is coupled to scale collection chamber 26, is periodically opened to remove accumulated scale and liquid. As noted above, in addition to the removal of precipitated solids, this flow also regulates the build-up of salts in the concentrate reservoir. This build-up occurs from the dissolved salts in the raw water that are removed from the product water and transferred to the concentrate chambers in the EDI cell as described earlier. To replace the volume of concentrate removed by this blowdown operation, water is added to concentrate reservoir 21 via valve 16a and flow path 16b.

Figure 4:
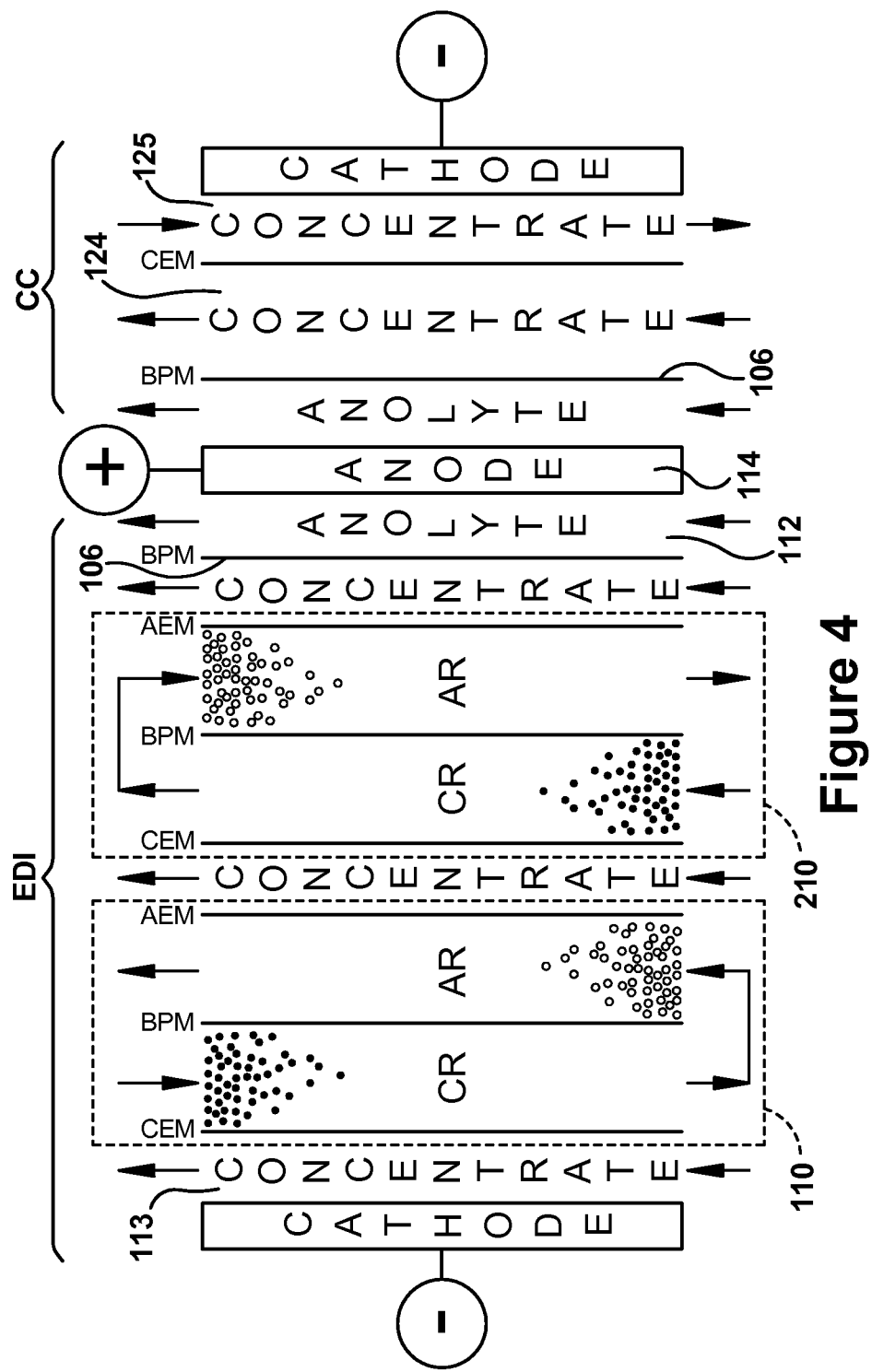
FIG. 4 is a schematic representation of an apparatus according another embodiment of the invention.

As discussed above, in some preferred embodiments the EDI unit and the CC unit can be configured to share a common anode. These embodiments are illustrated in FIG. 4. As seen in FIG. 4, the CC unit and the EDI unit can be configured into a single appliance wherein anode chamber 112 contains an electrode 114 operative at least as an anode bounded on opposite sides by bipolar membranes 106. As with the embodiments described above, the purpose of the bipolar membranes is to prevent chloride ions, among other things, from entering the anode chamber 112. To this end, those skilled in the art will appreciate that other interfaces, such as a cation exchange membrane, can be used in place of the preferred bipolar membranes. As illustrated in FIG. 4, the deionization cells 110, 210 and cathode compartment 113 of the EDI unit are disposed on one side of anode chamber 112, while the scale precipitation chamber 124 and acidification chamber 125 of the CC unit are disposed on the opposite side. In these embodiments, the remainder of the EDI unit and CC unit can be otherwise configured as described above and below in connection with the various embodiments of the invention.

Figure 5:
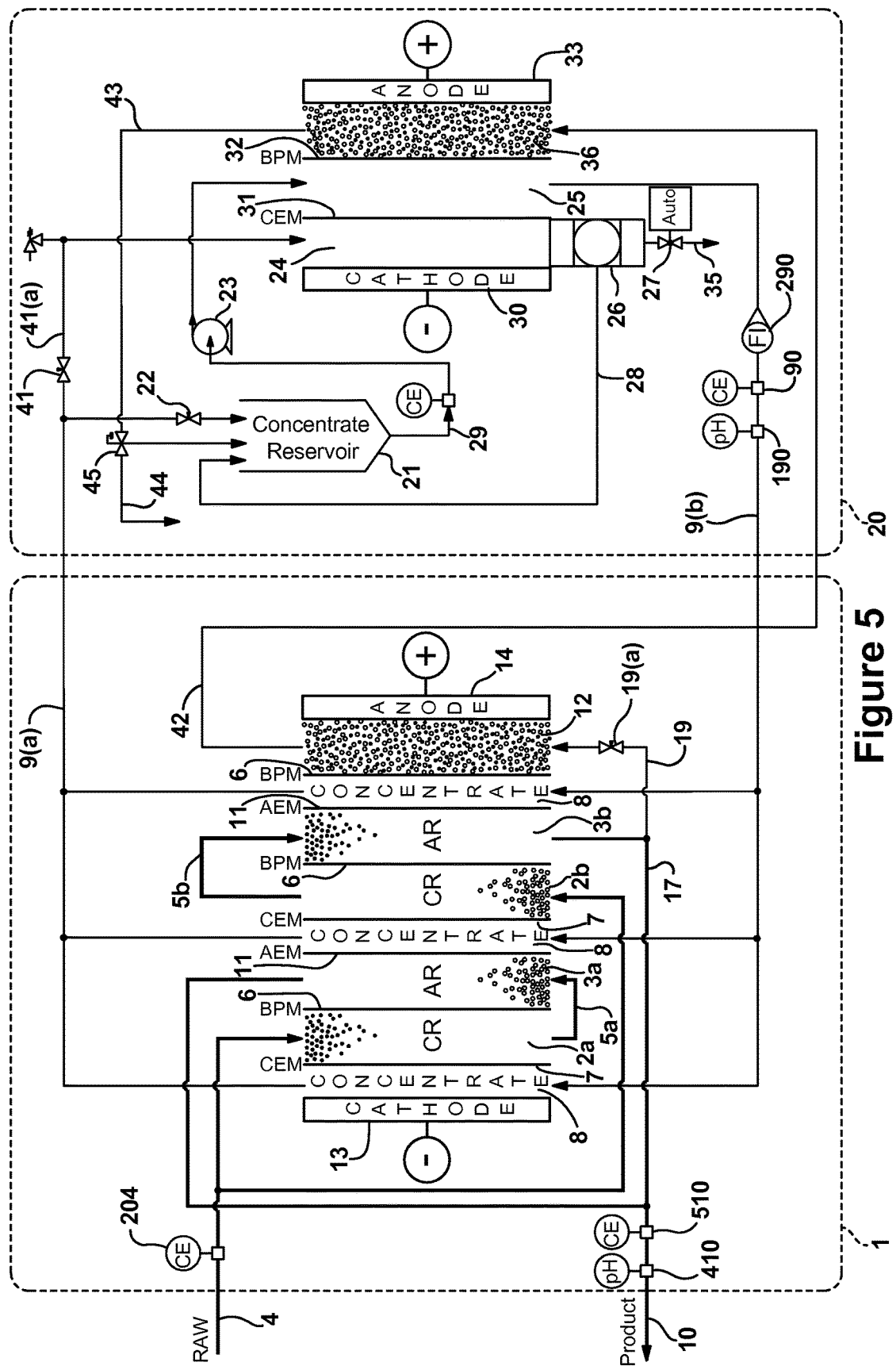
FIG. 5 is a schematic representation of an apparatus according to a further embodiment of the invention.

As alluded to above, in some embodiments the anode chambers of one or both of the EDI unit and CC units can be filled with regenerated cation exchange resin and substantially chloride free water rather than forming part of an anolyte loop. A preferred embodiment of these configurations is shown in FIG. 5. As seen in FIG. 5, anode chamber 12 of EDI unit 1 includes an inlet coupled to product water flow path 10 via valve 19a and inlet flow path 19, and an outlet coupled to an inlet to anode chamber 36 of CC unit 20 via flow path 42. An outlet from anode chamber 36 is coupled to concentrate reservoir 21 via conduit 43 and float valve 45. In this configuration, float valve 45 operates to divert product water flowing through the anode chamber 36 to concentrate reservoir 21 in an amount sufficient to balance any required volume lost as a result of purging the scale precipitation chamber via waste conduit 35 upon actuation of valve 27. Excess water from conduit 43 can be discarded via conduit 44 to a drain. The remaining elements of the EDI and CC units can be otherwise configured in accordance with the various embodiments described herein.

A further understanding of the method and apparatus of the invention will be had from the following non-limiting examples.

Example 1

An experimental system was built and configured according to FIG. 2. The effective area of the EDI electrodes and membranes was 24 sq. in. with 1.5 in. thick resin chambers. The concentrate and electrode chambers were supported with approximately 0.060 in. thick plastic mesh. The effective area of the CC Membranes was 26.7 sq. in. with a 1.5 in. deep cathode chamber and a 0.134 in. deep acidification chamber. The anode chamber was supported with approximately 0.045 in. thick plastic mesh. The system was operated as described in the preferred embodiment with a supplied voltage to the electrodes that resulted in 1.85 amps of current through the EDI cell and 5 amps of current through the CC unit. The feed water is Hamilton, Ontario municipal water, which comes from Lake Ontario. The water was analyzed to have the following:
Total dissolved solids (TDS)—177 mg/L
Hardness level—140 mg/L as $CaCO_3$
Average conductivity—320 microsiemens/cm Total Ammonia—0.35 mg/L
Total Kjeldahl Nitrogen (TKN)—0.5 mg/L
Dissolved Organic Carbon—1.7 mg/L
pH—8.1
Dissolved Sulphate—27 mg/L
Alkalinity (Total as $CaCO_3$)—80 mg/L
Dissolved Chloride—29 mg/L
Nitrate—0.3 mg/L The system was fed at flow rates ranging from 0 L/min to 4.1 L/min, simulating a ⅙ scale household use pattern. Under these conditions the system operated for a continuous period of 450 hours which produced over 3,200 L of purified water. The purified water had a hardness concentration that was below the detection limit of 0.1 mg/L, and an average conductivity of 5.6 microsiemens. The hardness was successfully removed from the system in the cathode chamber of the CC unit. This was accomplished by actuating a manually triggered solenoid valve for a fraction of a second multiple times per day. The volume discharged per flush was kept small so that the change in concentrate composition would be minimized and the quantity of new salts added from the EDI portion of the system were approximately equal to the quantity of salts being discharged. Upon completion of the test, a disassembly of the EDI cell confirmed that no scale had formed in it.

Example 2

Example 2 is a prophetic example using calculated results to construct a mathematical model of how a system would respond to a set of specific design criteria. This example will also illustrate the steps needed to design a system for other flow and loading rates. In this example, the total capacity of the anion exchange resin stated by the manufacturer is used to calculate remaining resin capacity. The total capacity of cation exchange resin is typically much higher than anion exchange resin, in this case 44% higher. Actual resin operating capacities are significantly lower than the manufacter's stated total capacity, typically approximately 70% of total capacity.

In this example, 100% capacity of the resin is defined as the amount of resin volume in service required to treat the design flow and loading over 24 hours, also assuming that the resin is 100% regenerated at the beginning of the simulation.

Design Criteria
Daily usage 1,416 liters/day
Peak Flow 23 liters/minute
TDS 177 mg/liter
Flow usage pattern based on typical house hold consumption, based upon a 1999 AWWA Research Foundation Study titled "Residential End Uses of Water", pages 33 through 38.
Apparatus
EDI:
Six (6) Cation Chambers containing 750 ml of Purolite SST60H+ Cation Resin each, a total of 4.5 liters with total manufacturers stated capacity of 8.1 equivalents.
Six (6) Anion Chambers containing 750 ml of Purolite PPA850OH- Resin each, a total of 4.5 liters with total manufacturers stated capacity of 5.63 equivalents.
Six (6) Cation Membranes, Six (6) Anion Membranes, and Seven (7) Bipolar Membranes (one of the seven used to isolate the Anode)
CC:
Configured as described in Example 1.
Operation For the purpose of this example it is assumed that a system as shown in FIG. 2, but having six cation resin chambers, six anion resin chambers and six concentrate chambers is used. Hamilton Lake Ontario City water, with a TDS Concentration of 177 mg/L as $CaCO_3$, was used as a basis for this simulation in a water usage pattern simulating home water consumption (e.g. toilet fill rate of 3.8 L/min, shower 10 L/min, multi-use 23 L/min) with the total production yielding 1416 L/day.

The EDI is operated at a current (2.0 A) required to treat an equivalent of twice the intended daily treatment capacity (taking into account an efficiency of 50%) which corresponds to 100%/24 hours or 4.2%/hour. Peak flows during daily use may consume 20% of daily capacity in a relatively short period of time (i.e. 40 minutes) which in a traditional EDI unit, without reserve capacity, would require tremendous amounts of current (e.g. Using six (6) cell pairs, at 23 L/min and 188 mg/L, a current flow of 59 amps would be required based on a 50% current efficiency factor) since the ions would have to be removed in real time, as fast as they entered the system.

Figure 7:
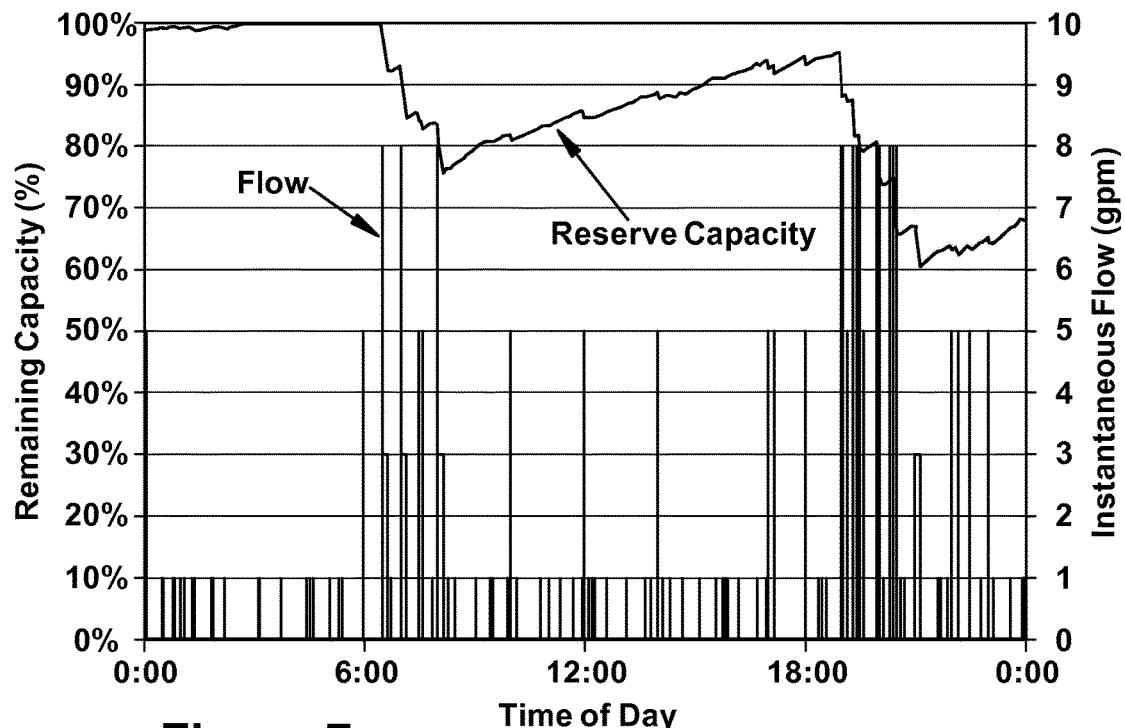
FIG. 7 is a graph of the treatment capacity resulting from continuous regeneration of an apparatus according to the invention over 24 hours.
Figure 8:
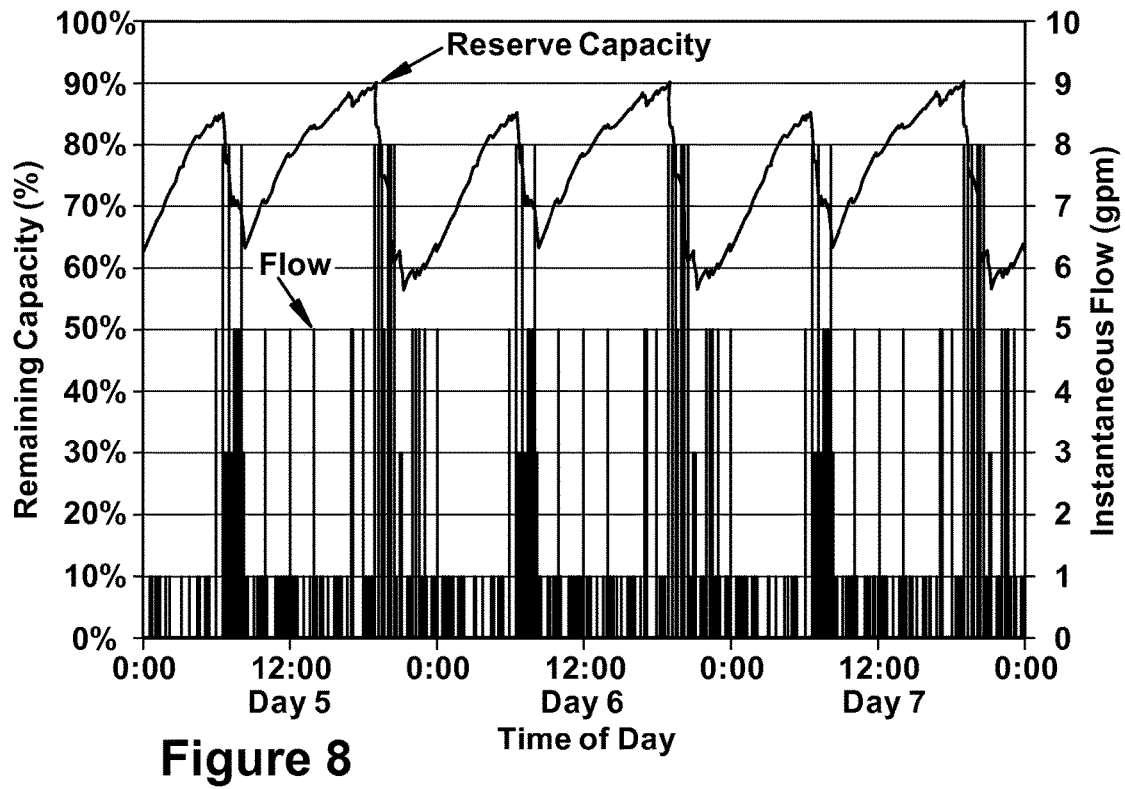
FIG. 8 is a graph of the theoretical treatment capacity of an apparatus employing continuous regeneration according to the invention over a prolonged period.

FIG. 7 shows the treatment capacity of this theoretical cell at continuous regeneration for one day. FIG. 7 demonstrates the relationship between the continuous regeneration of the EDI cell and reserve capacity on the first day of operation. 100% represents the total capacity needed to treat 1416 L per day of 188 mg/L water. This is based upon the anion resin operating capacity since anion resin capacity is lower than cation resin capacity. The preferred operation of the cell will keep the reserve capacity well above 50% of total capacity on Day 1. FIG. 2 shows the response of the system after the initial run-in period. While the system never regains 100% of the initial operating capacity, it stays well above 50% of the operating capacity at all times, even after a prolonged period of peak flow rate. This allows a safety factor. Under these conditions, peak flows can be accommodated while the treatment device remains operating at a low amperage of 2 amps, and reasonably sized and economical for household use.

What is claimed is:
1. A water treatment apparatus comprising:
a) an electrodeionization unit comprising:
  i) at least one ion exchange chamber containing ion exchange media;
  ii) a cathode chamber located on one side of said at least one ion exchange chamber and containing at least one electrode operative at least as a cathode;
  iii) an anode chamber located on a side of said at least one ion exchange chamber opposite said cathode chamber and containing at least one electrode operative at least as an anode;
  iv) at least one concentrate chamber adapted to receive ions removed from a feed water source to said ion exchange chamber via an ion exchange membrane; and,
  v) a concentrate stream flow path coupled to said electrodeionization unit for receiving a concentrate stream produced in said electrodeionization unit; and,
b) a concentrate conditioning unit coupled to said concentrate stream flow path for receiving said concentrate stream produced by said electrodeionization unit comprising;
  i) a scale precipitation chamber adapted to precipitate and accumulate scale for periodic disposal from the apparatus in said scale precipitation chamber in fluid communication with at least a portion of said con- centrate stream and containing at least one electrode operative at least as a cathode;

ii) an acidification chamber adjacent said scale precipitation chamber and separated therefrom by a cation exchange membrane, said acidification chamber having an inlet coupled to a concentrate stream source and an outlet coupled to an acidified concentrate stream flow path; and, iii) an anode chamber adjacent said acidification chamber and on a side distal said scale precipitation chamber and containing at least one electrode operative at least as an anode;

whereby, upon activation of said electrodes, scale forming ions present in a concentrate stream passing through said scale precipitation chamber are precipitated therein.

2. An apparatus according to claim 1, wherein said anode chamber of said concentrate conditioning unit is bound on a side adjacent said acidification chamber by an interface adapted to prevent transport of chlorine ions into said anode chamber.

3. An apparatus according to claim 2 wherein said interface is selected from a bipolar membrane and a cation exchange membrane.

4. The apparatus of claim 1, wherein said concentrate stream source is a reservoir coupled to at least one of an output stream of said scale precipitation chamber, a raw feed water source or said concentrate stream flow path.

5. The apparatus of claim 1, wherein the surface area of said electrode(s) in said scale precipitation chamber is less than about $1/10$ the surface area of said electrode(s) in said anode chamber.

6. The apparatus of claim 1, wherein the surface area of said electrode(s) in said scale precipitation chamber is less than about $1/3$ the surface area of said electrode(s) in said anode chamber.

* * * * *